US010889240B2

(12) United States Patent
Wang et al.

(10) Patent No.: US 10,889,240 B2
(45) Date of Patent: Jan. 12, 2021

(54) METHOD, COMPUTER DEVICE AND STORAGE MEDIUM FOR COMMUNICATING WITH A REAR VEHICLE

(71) Applicant: BAIDU ONLINE NETWORK TECHNOLOGY (BEIJING) CO., LTD., Beijing (CN)

(72) Inventors: Ya Wang, Beijing (CN); Weiyi Ning, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/598,525

(22) Filed: Oct. 10, 2019

(65) Prior Publication Data
US 2020/0114814 A1    Apr. 16, 2020

(30) Foreign Application Priority Data

Oct. 11, 2018   (CN) .......................... 2018 1 1184764

(51) Int. Cl.
*B60Q 1/50* (2006.01)
*B60Q 1/26* (2006.01)
(Continued)

(52) U.S. Cl.
CPC ............ *B60Q 1/503* (2013.01); *B60Q 1/2611* (2013.01); *B60Q 1/30* (2013.01); *B60R 11/04* (2013.01);
(Continued)

(58) Field of Classification Search
CPC ........ B60Q 1/503; B60Q 1/30; B60Q 1/2611; G06K 9/00845; G06K 9/00302; B60R 11/04
See application file for complete search history.

(56) References Cited

U.S. PATENT DOCUMENTS

| 6,300,870 B1 | 10/2001 | Nelson |
| 2016/0089954 A1 | 3/2016 | Rojas Villanueva |

(Continued)

FOREIGN PATENT DOCUMENTS

| CN | 104021673 A | 9/2014 |
| CN | 105667387 A | 6/2016 |

(Continued)

OTHER PUBLICATIONS

Chinese Search Report for Application No. CN 201811184764.5, dated Jul. 19, 2019, 3 Pages.
(Continued)

*Primary Examiner* — James J Yang
(74) *Attorney, Agent, or Firm* — Lando & Anastasi, LLP

(57) ABSTRACT

The present disclosure provides a method, apparatus, computer device and storage medium for communicating with a rear vehicle, wherein the method comprises: a present vehicle determining that it is currently in a congestion scenario and obtaining congestion condition information; the present vehicle generating congestion prompt information for the rear vehicle according to the congestion condition information; the present vehicle displaying the congestion prompt information on a screen at a tail of the present vehicle. The solution of the present disclosure can be applied to improve the safety of the travel of the vehicle.

7 Claims, 7 Drawing Sheets

(51) Int. Cl.
- *B60Q 1/30* (2006.01)
- *B60R 11/04* (2006.01)
- *G06K 9/00* (2006.01)

(52) U.S. Cl.
CPC ..... *G06K 9/00302* (2013.01); *G06K 9/00845* (2013.01)

(56) References Cited

U.S. PATENT DOCUMENTS

| | | |
|---|---|---|
| 2017/0190286 A1 | 7/2017 | Yavitz |
| 2017/0197544 A1 | 7/2017 | Wang et al. |
| 2018/0173237 A1* | 6/2018 | Reiley ............... G05D 1/0061 |
| 2018/0174457 A1 | 6/2018 | Taylor |
| 2019/0389487 A1* | 12/2019 | Gowda ............... B60Q 1/503 |

FOREIGN PATENT DOCUMENTS

| | | |
|---|---|---|
| CN | 105946701 A | 9/2016 |
| CN | 106627351 A | 5/2017 |
| CN | 106803423 A | 6/2017 |
| DE | 202009016272 U1 | 6/2010 |
| EP | 3093192 A1 | 11/2016 |
| KR | 20170098666 A | 8/2017 |

OTHER PUBLICATIONS

First Office Action for Chinese Application No. 201811184764.5, dated Jul. 29, 2019, 8 Pages.

Communication under Rules 70(2) and 70a(2) EPC and reference to Rule 39(1) EPC from corresponding European Application No. 19202565.8 dated Apr. 20, 2020.

Extended European Search Report from corresponding European Application No. 192025665.8 dated Feb. 27, 2020.

\* cited by examiner

US 10,889,240 B2

METHOD, COMPUTER DEVICE AND STORAGE MEDIUM FOR COMMUNICATING WITH A REAR VEHICLE

CROSS-REFERENCE TO RELATED APPLICATION

This application claims priority to Chinese Patent Application No. 201811184764.5, filed on Oct. 11, 2018, with the title of "Method, apparatus, computer device and storage medium for communicating with a rear vehicle," which is incorporated herein by reference in its entirety.

FIELD OF THE DISCLOSURE

The present disclosure relates to computer application technologies, and particularly to a method, computer device and storage medium for communicating with a rear vehicle.

BACKGROUND OF THE DISCLOSURE

Regarding current road conditions in all countries, as the number of motor vehicles increases abruptly, congestion often occurs due to weather, accidents, rush hour and other reasons.

For a driver driving a vehicle on the road, he usually needs to learn about information such as a cause for congestion for example by querying an APP on a mobile phone, which will undoubtedly cause a certain travelling danger, thereby affecting the safety of the travel of the vehicle.

SUMMARY OF THE DISCLOSURE

In view of the above, the present disclosure provides a method, apparatus, computer device and storage medium for communicating with a rear vehicle.

Specific technical solutions are as follows:

A method for communicating with a rear vehicle, comprising:

a present vehicle determining that it is currently in a congestion scenario and obtaining congestion condition information;

the present vehicle generating congestion prompt information for the rear vehicle according to the congestion condition information;

the present vehicle displaying the congestion prompt information on a screen at a tail of the present vehicle.

According to a preferred embodiment of the present disclosure, the present vehicle determining that it is currently in a congestion scenario comprises:

the present vehicle determines that the present vehicle is currently in the congestion scenario if the present vehicle determines that a duration of the following state exceeds a predetermined duration: the current traffic slowly advances at a speed below a predetermined threshold.

According to a preferred embodiment of the present disclosure, the obtaining the congestion condition information comprises:

the present vehicle obtaining the congestion condition information by interacting with an Internet-connected intelligent transportation system.

According to a preferred embodiment of the present disclosure, the congestion prompt information at least includes: a cause of congestion;

the cause of congestion includes at least one of the following: an accident ahead, heavy traffic ahead, temporary road closures ahead, and congestion caused by weather.

According to a preferred embodiment of the present disclosure, the method further comprises:

the present vehicle determining whether the driver of the rear vehicle is in a road rage mood;

if yes, generating mood-soothing information and displaying the mood-soothing information on the screen.

According to a preferred embodiment of the present disclosure, the present vehicle determining whether the driver of the rear vehicle is in a road rage mood comprises:

the present vehicle obtaining facial expressions and/or behaviors of the driver of the rear vehicle through a camera at the tail of the present vehicle, and determining whether the driver of the rear vehicle is in the road rage mood by analyzing the facial expressions and/or behaviors.

According to a preferred embodiment of the present disclosure, the method further comprises:

upon determining that the driver of the rear vehicle is in the road rage mood, the present vehicle turning on a streamline type lamp strip on the roof of the present vehicle and/or an annular lamp strip at the tail of the present vehicle to sooth the mood of the driver of the rear vehicle in a flowing pattern of atmosphere lamps.

An apparatus for communicating with a rear vehicle, the apparatus being applied to a present vehicle and comprising: an information interaction unit and a first communicating unit;

the information interaction unit is configured to obtain congestion condition information upon determining that the present vehicle is currently in a congestion scenario;

the first communication unit is configured to generate congestion prompt information for the rear vehicle according to the congestion condition information, and display the congestion prompt information on a screen at a tail of the present vehicle.

According to a preferred embodiment of the present disclosure, the information interaction unit determines that the present vehicle is currently in the congestion scenario if the information interaction unit determines that a duration of the following state exceeds a predetermined duration: the current traffic slowly advances at a speed below a predetermined threshold.

According to a preferred embodiment of the present disclosure, the information interaction unit obtains the congestion condition information by interacting with an Internet-connected intelligent transportation system.

According to a preferred embodiment of the present disclosure, the congestion prompt information at least includes: a cause of congestion;

the cause of congestion includes at least one of the following: an accident ahead, heavy traffic ahead, temporary road closures ahead, and congestion caused by weather.

According to a preferred embodiment of the present disclosure, the apparatus further comprises: a second communication unit;

the second communication unit is configured to determine whether the driver of the rear vehicle is in a road rage mood, and if yes, generate mood-soothing information and display the mood-soothing information on the screen.

According to a preferred embodiment of the present disclosure, the second communication unit obtains facial expressions and/or behaviors of the driver of the rear vehicle through a camera at the tail of the present vehicle, and determines whether the driver of the rear vehicle is in the road rage mood by analyzing the facial expressions and/or behaviors.

According to a preferred embodiment of the present disclosure, the second communication unit is further configured to, upon determining that the driver of the rear vehicle is in the road rage mood, turn on a streamline type lamp strip on the roof of the present vehicle and/or an annular lamp strip at the tail of the present vehicle to sooth the mood of the driver of the rear vehicle in a flowing pattern of atmosphere lamps.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As may be seen from the above introduction, according to the solutions of the present disclosure, the present vehicle may obtain congestion condition information after determining that the present vehicle is currently in a congestion scenario, and generate congestion prompt information for the rear vehicle according to the congestion condition information, and display the congestion prompt information on a screen at a tail of the present vehicle, so that the rear vehicle can be enabled to learn about the congestion condition ahead in time without querying an APP on the mobile phone, such that the safety of vehicle travel is improved.

DETAILED DESCRIPTION

The present disclosure provides a solution of communicating with a rear vehicle, and changing a present vehicle in a congestion scenario into an information source of the rear vehicle, thereby enhancing the travel safety of the rear vehicle. The present vehicle is a vehicle having an autonomous driving function.

Preferably, the present vehicle in the solution of the present disclosure may be an autonomous vehicle capable of achieving L5 autonomous driving level, namely, capable of autonomously achieving all operations of travel on urban roads and capable of accurately recognizing elements such as ambient environment factors, vehicles on the road surface, electrically-motored vehicles, bicycles and pedestrians, and additionally capable of interacting with an Internet-connected intelligent transportation system.

Figure 1:
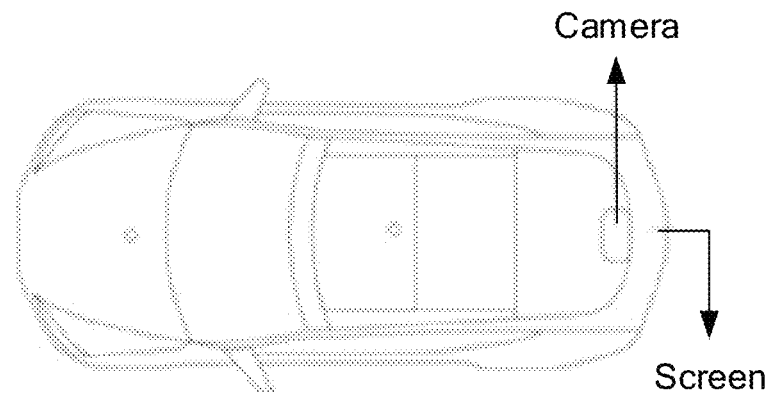
FIG. 1 is a schematic view showing a position of a screen and a camera according to the present disclosure.
Figure 2:
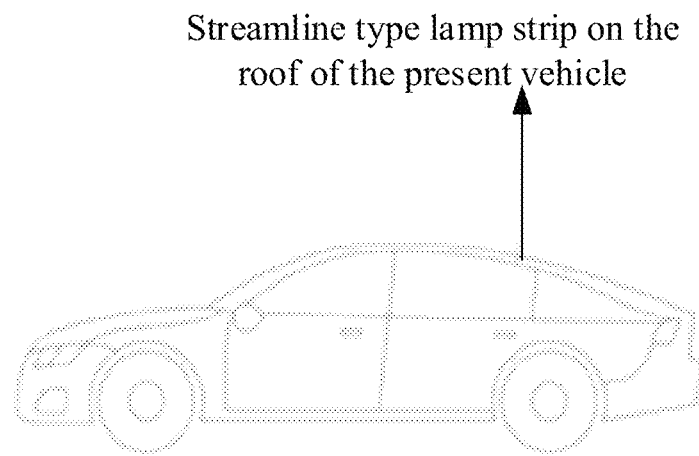
FIG. 2 is a schematic view showing a position of a streamline type lamp strip on a roof of a vehicle according to the present disclosure.
Figure 3:
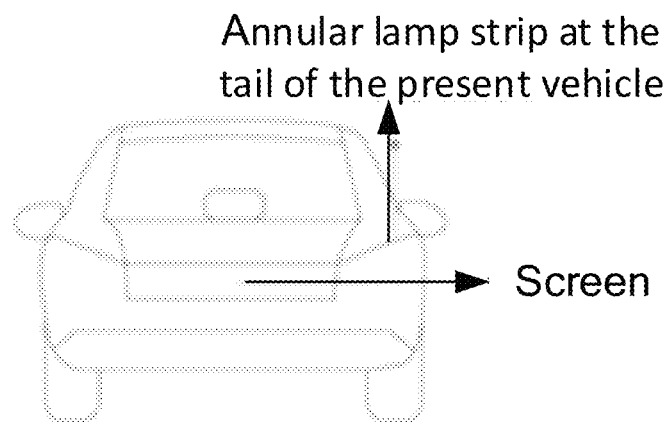
FIG. 3 is a schematic view showing a position of an annular lamp strip at the tail of the present vehicle according to the present disclosure.

The present vehicle in the solution of the present disclosure may be provided with a screen located at a tail of the present vehicle, a camera located at the tail of the present vehicle, a streamline type lamp strip on a roof of the present vehicle and an annular lamp strip at the tail of the present vehicle. As shown in FIGS. 1-3, FIG. 1 is a schematic view showing a position of the screen and the camera according to the present disclosure, FIG. 2 is a schematic view showing a position of a streamline type lamp strip on the roof of the present vehicle according to the present disclosure, and FIG. 3 is a schematic view showing a position of an annular lamp strip at the tail of the present vehicle according to the present disclosure.

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

In addition, it should be appreciated that the term "and/or" used in the text is only an association relationship depicting associated objects and indicates that three relations might exist, for example, A and/or B may represent three cases, namely, A exists individually, both A and B coexist, and B exists individually. In addition, the symbol "/" in the text generally indicates associated objects before and after the symbol are in an "or" relationship.

Figure 4:
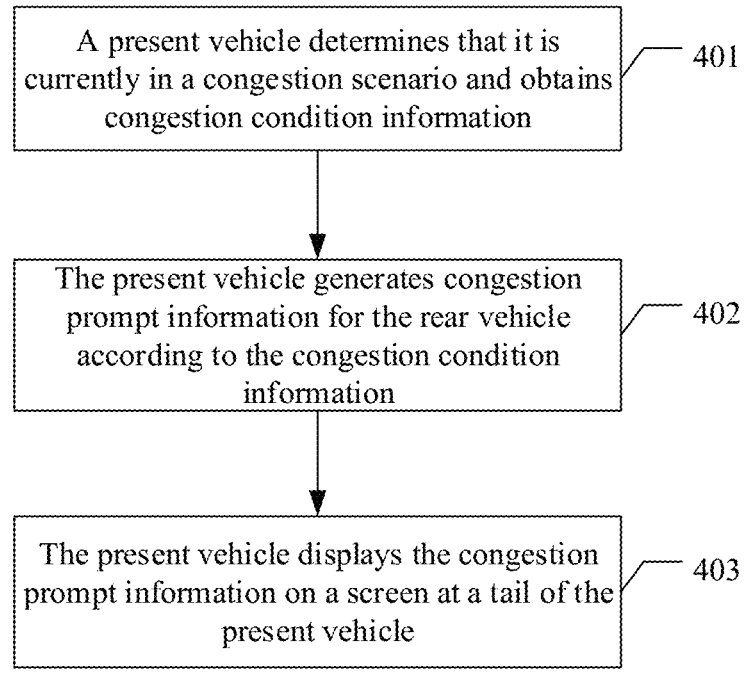
FIG. 4 is a flow chart of a method of communicating with a rear vehicle according to an embodiment of the present disclosure.

FIG. 4 is a flow chart of a method of communicating with a rear vehicle according to an embodiment of the present disclosure. As shown in FIG. 4, the embodiment includes the following specific implementation mode.

At 401, a present vehicle determines that it is currently in a congestion scenario and obtains congestion condition information.

At 402, the present vehicle generates congestion prompt information for the rear vehicle according to the congestion condition information.

At 403, the present vehicle displays the congestion prompt information on a screen at a tail of the present vehicle.

When the present vehicle is driving on the road, it may determine whether it is currently in a congestion scenario in real time, and if it is in a congestion scenario, it may trigger a function of communicating with the rear vehicle.

Preferably, when the present vehicle determines that a duration of the following state exceeds a predetermined duration: the current traffic slowly advances at a speed below a predetermined threshold, the present vehicle may determine that it is currently in the congestion scenario.

Specific values of the predetermined duration and the predetermined threshold may depend on actual needs. For example, the predetermined duration may be 10 mins, and the predetermined threshold may be 10 km/h. That is to say, if the current traffic slowly advances at a speed lower than 10 km/h, and this state lasts for more than 10 mins, it may be determined that the present vehicle is currently in the congestion scenario.

After determining that it is currently in the congestion scenario, the present vehicle may obtain the congestion condition information. Specifically, the present vehicle may interact with the Internet-connected intelligent transportation system to obtain the congestion condition information.

Thereafter, the present vehicle may generate congestion prompt information for the rear vehicle according to the obtained congestion condition information. The congestion prompt information may at least include: a cause of congestion. The cause of congestion may include, but is not limited to, an accident ahead, heavy traffic ahead, temporary road closures ahead, and congestion caused by weather.

In addition to the cause of congestion, the congestion prompt information may further include some other information, such as a duration before the road becomes clear again. Specific content included is not limited here.

The above content may be illustrated as follows:
1) Traffic Accident Ahead

The present vehicle may know that the congestion is caused by a traffic accident happening ahead, by interacting with the Internet-connected intelligent transportation system, and may know a distance of the traffic accident site from the present vehicle and happening time of the traffic accident by interacting with the Internet-connected intelligent transportation system, and furthermore may determine an average vehicle-removing time of a corresponding type of accidents by querying a pre-generated historical accident library, and thereby infer how long the road will become clear again.

Figure 5:
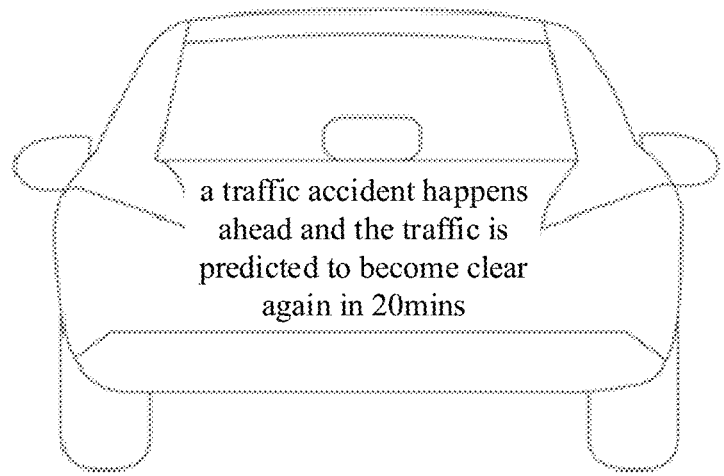
FIG. 5 is a first schematic view of information displayed on a screen at a tail of a present vehicle according to the present disclosure.

Then, the congestion prompt information may be generated and displayed on the screen at the tail of the present vehicle. FIG. 5 is a first schematic view of information displayed on a screen at a tail of a present vehicle according to the present disclosure. As shown in FIG. 5, the displayed content may be that a traffic accident happens ahead and the traffic is predicted to become clear again in 20 mins. In practical application, various forms of display such as text, graphics or the like may be employed, and are not limited to those shown in the figures.
2) Heavy Traffic Ahead The present vehicle may know that the congestion is caused by heavy traffic ahead by interacting with the Internet-connected intelligent transportation system, and know a traffic index of the road segment in the same time period in the past and then determine whether the traffic is currently in the normal daily situation by interacting with the Internet-connected intelligent transportation system, and if the traffic is abnormal, may further query the Internet-connected intelligent transportation system to find out whether there is special road closure information on the current day.

Figure 6:
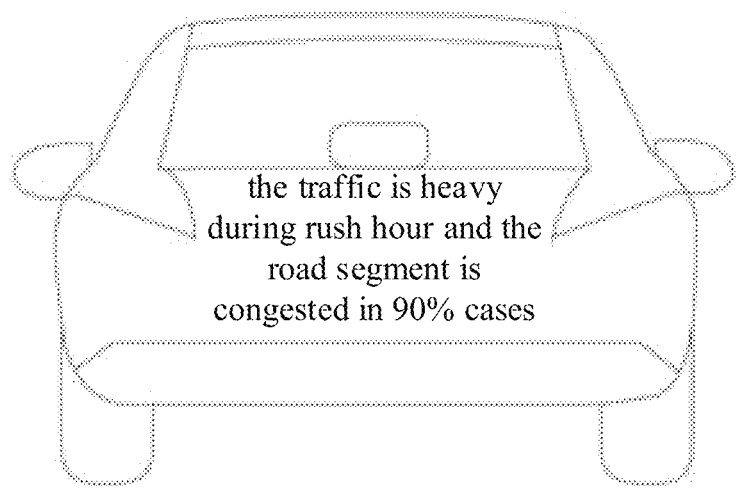
FIG. 6 is a second schematic view of information displayed on a screen at a tail of a present vehicle according to the present disclosure.
Figure 7:
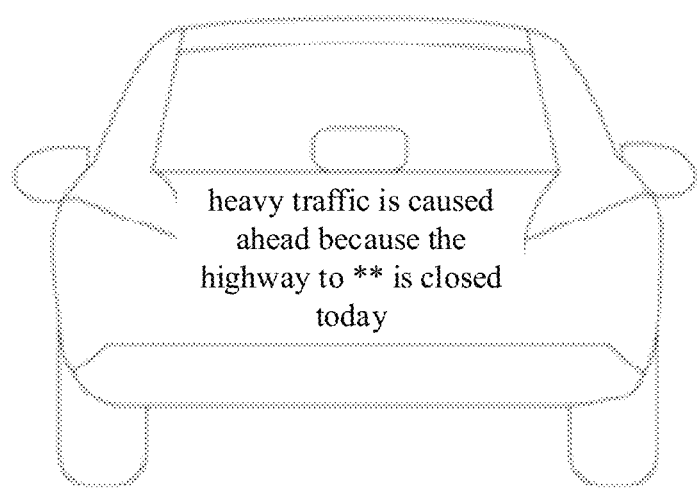
FIG. 7 is a third schematic view of information displayed on a screen at a tail of a present vehicle according to the present disclosure.

Then, the congestion prompt information may be generated and displayed on the screen at the tail of the present vehicle. FIG. 6 is a second schematic view of information displayed on a screen at a tail of a present vehicle according to the present disclosure. As shown in FIG. 6, the displayed content may be that the traffic is heavy during rush hour and the road segment is congested in 90% cases. FIG. 7 is a third schematic view of information displayed on a screen at a tail of a present vehicle according to the present disclosure. As shown in FIG. 7, the displayed content may be that heavy traffic is caused ahead because the highway to ** is closed today.
3) Congestion Caused by Weather The present vehicle may acquire weather information and weather changes which are happening in a range of 10 km around on the current day by interacting with the Internet-connected intelligent transportation system, and then perform synchronization of weather information and/or provide early warning of weather ahead through the screen.

Figure 8:
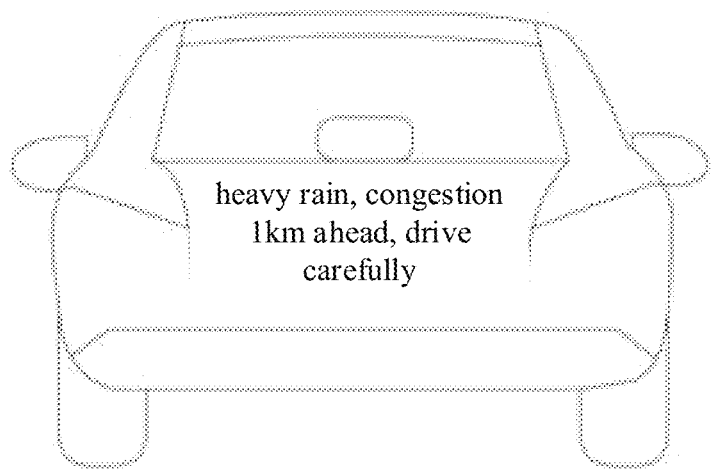
FIG. 8 is a fourth schematic view of information displayed on a screen at a tail of a present vehicle according to the present disclosure.
Figure 9:
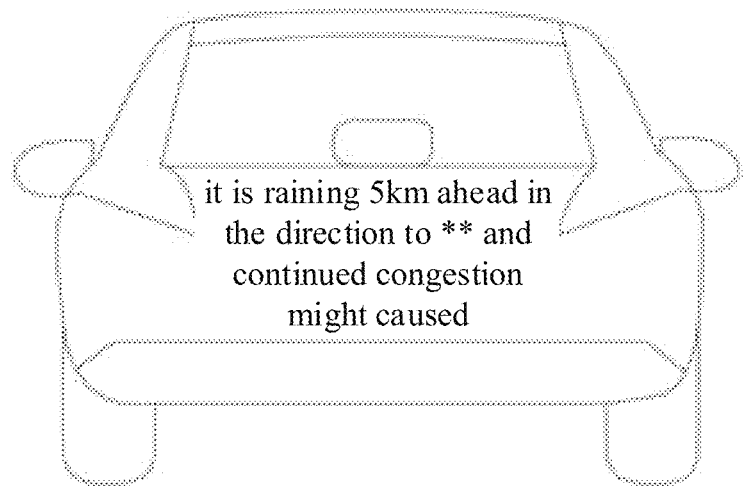
FIG. 9 is a fifth schematic view of information displayed on a screen at a tail of a present vehicle according to the present disclosure.

FIG. 8 is a fourth schematic view of information displayed on a screen at a tail of a present vehicle according to the present disclosure. As shown in FIG. 8, the displayed content may be heavy rain, congestion 1 km ahead, drive carefully. FIG. 9 is a fifth schematic view of information displayed on a screen at a tail of a present vehicle according to the present disclosure. As shown in FIG. 9, the displayed content may be that it is raining 5 km ahead in the direction to ** and continued congestion might be caused.

In the above processing manner, the rear vehicle can be enabled to learn about the congestion condition ahead in time without querying an APP on the mobile phone, so that the safety of vehicle travel is improved.

In addition, when the vehicle is in a congestion state in a long waiting queue for a long time, the driver is prone to irritability, e.g. get into a road rage mood on the road. This mood exerts a very large impact on the safety of the travel of the vehicle.

Regarding this problem, it is proposed in the present embodiment that the present vehicle may detect the mood of the driver of the rear vehicle, namely, determine whether the driver of the rear vehicle is in a road rage mood. Once determining that the driver of the rear vehicle is in the road rage mood, the present vehicle may generate mood-soothing information and display the mood-soothing information on the screen.

Specifically, the present vehicle may obtain facial expressions and/or behaviors of the driver of the rear vehicle through the camera at the tail of the present vehicle, and determine whether the driver of the rear vehicle is in the road rage mood by analyzing the obtained facial expressions and/or behaviors.

For example, it may be believed that the driver of the rear vehicle is in the road rage mood if it is found after analysis that the facial expressions of the driver of the rear vehicle show negative moods such as agitation and anger and the driver of the rear vehicle exhibits behaviors such as constantly looking out of the window to see situations ahead, patting the steering wheel, and opening and closing mouth (e.g., swearing).

Upon determining that the driver of the rear vehicle is in the road rage mood, the present vehicle may generate mood-soothing information and display the mood-soothing information on the screen. Preferably, the mood-soothing information and congestion prompt information may be displayed on the screen alternatingly.

Figure 10:
FIG. 10 is a sixth schematic view of information displayed on a screen at a tail of a present vehicle according to the present disclosure.

FIG. 10 is a sixth schematic view of information displayed on a screen at a tail of a present vehicle according to the present disclosure. As shown in FIG. 10, the displayed content (mood-soothing information) may be: bad weather, please take it easy, sing a song and relax. The content displayed in FIG. 10 and the content displayed in FIG. 8 are displayed on the screen alternatingly.

Figure 11:
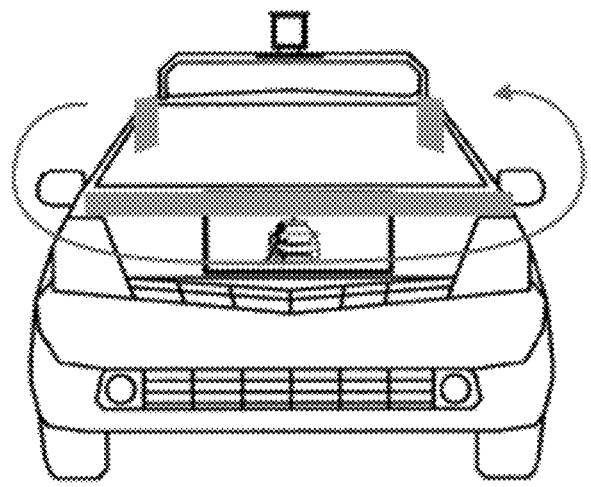
FIG. 11 is a schematic view showing a flow pattern of a lamp strip of a present vehicle according to the present disclosure.

In addition, upon determining that the driver of the rear vehicle is in the road rage mood, the present vehicle may further turn on the streamline type lamp strip on the roof of the present vehicle and/or the annular lamp strip at the tail of the present vehicle to sooth the mood of the driver of the rear vehicle in a flowing manner of atmosphere lamps. FIG. 11 is a schematic view showing a flow pattern of a lamp strip of the present vehicle according to the present disclosure.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In summary, according to the solutions of the method embodiments of the present disclosure, the present vehicle can become information source of the rear vehicle in a congestion scenario, and recognize the road rage mood of the driver of the rear vehicle and sooth him in time, so that the present vehicle really becomes a smart terminal travelling on the road, and the present vehicle becomes a smart transportation carrier which is trusted more and provides better safety.

The above introduces the method embodiments. The solution of the present disclosure will be further described through an apparatus embodiment.

Figure 12:
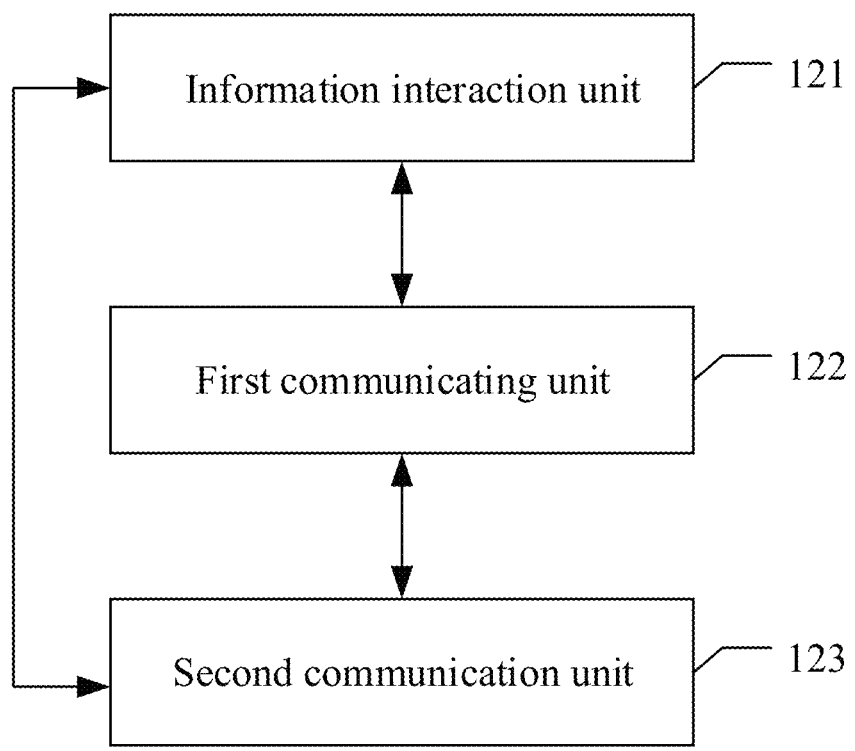
FIG. 12 is a block diagram of an apparatus for communicating with a rear vehicle according to an embodiment of the present disclosure.

FIG. 12 is a block diagram of an apparatus for communicating with a rear vehicle according to an embodiment of the present disclosure. As shown in FIG. 12, the apparatus comprises: an information interaction unit 121 and a first communicating unit 122.

The apparatus of the present application is applied in the present vehicle.

The information interaction unit 121 is configured to obtain congestion condition information upon determining that a present vehicle is currently in a congestion scenario.

The first communication unit 122 is configured to generate congestion prompt information for the rear vehicle according to the congestion condition information, and display the congestion prompt information on a screen at a tail of the present vehicle.

Preferably, the information interaction unit 121 determines that a duration of the following state exceeds a predetermined duration: the current traffic slowly advances at a speed below a predetermined threshold, and then determines that the present vehicle is currently in the congestion scenario.

Specific values of the predetermined duration and the predetermined threshold may depend on actual needs. For example, the predetermined duration may be 10 mins, and the predetermined threshold may be 10 km/h. That is to say, if the current traffic slowly advances at a speed lower than 10 km/h, and this state lasts for more than 10 mins, it may be determined that the present vehicle is currently in the congestion scenario.

After determining that the present vehicle is currently in the congestion scenario, the information interaction unit 121 may obtain the congestion condition information. Specifically, the information interaction unit 121 may interact with the Internet-connected intelligent transportation system to obtain the congestion condition information.

Thereafter, the first communication unit 122 may generate congestion prompt information for the rear vehicle according to the obtained congestion condition information. The congestion prompt information may at least include: a cause of congestion. The cause of congestion may include, but is not limited to, an accident ahead, heavy traffic ahead, temporary road closures ahead, and congestion caused by weather.

In addition to the cause of congestion, the congestion prompt information may further include some other information, such as a duration before the road becomes clear again. Specific content included is not limited here.

In the above processing manner, the rear vehicle can be enabled to learn about the congestion condition ahead without querying an APP on the mobile phone, so that the safety of vehicle travel is improved.

In addition, when the vehicle is in a congestion state in a long waiting queue for a long time, the driver is prone to irritability, e.g. get into a road rage mood on the road. This mood exerts a very large impact on the safety of the travel of the vehicle.

Regarding this problem, the apparatus according to the present embodiment may further comprise: a second communication unit 123 configured to determine whether the driver of the rear vehicle is in a road rage mood when in the congestion scenario, and if yes, generate mood-soothing information and display the mood-soothing information on the screen. That is to say, the second communication unit 123 may detect the mood of the driver of the rear vehicle, namely, determine whether the driver of the rear vehicle is in a road rage mood. Once determining that the driver of the rear vehicle is in the road rage mood, the second communication unit 123 may generate mood-soothing information and display the mood-soothing information on the screen.

The second communication unit 123 may obtain facial expressions and/or behaviors of the driver of the rear vehicle through a camera at the tail of the present vehicle, and thereby determine whether the driver of the rear vehicle is in the road rage mood by analyzing the obtained facial expressions and/or behaviors.

For example, it may be believed that the driver of the rear vehicle is in the road rage mood if it is found after analysis that the facial expressions of the driver of the rear vehicle show negative moods such as agitation and anger and the driver of the rear vehicle exhibits behaviors such as constantly looking out of the window to see situations ahead, patting the steering wheel, and opening and closing mouth (e.g., swearing).

Upon determining that the driver of the rear vehicle is in the road rage mood, the second communication unit 123 may generate mood-soothing information and display the mood-soothing information on the screen. Preferably, the mood-soothing information and congestion prompt information generated by the first communication unit 122 may be displayed on the screen alternatingly.

In addition, upon determining that the driver of the rear vehicle is in the road rage mood, the second communication unit 123 may further turn on the streamline type lamp strip on the roof of the present vehicle and/or the annular lamp strip at the tail of the present vehicle to sooth the mood of the driver of the rear vehicle in a flowing manner of atmosphere lamps.

Reference may be made to relevant depictions in the above method embodiments for a specific workflow of the above apparatus embodiment shown in FIG. 12, which will not be detailed any more here.

To sum up, according to the solution of the apparatus embodiment of the present disclosure, the present vehicle can become information source of the rear vehicle in a congestion scenario, and recognize the road rage mood of the driver of the rear vehicle and sooth him in time, so that the present vehicle really becomes a smart terminal travelling on the road, and the present vehicle becomes a smart transportation carrier which is trusted more and provides better safety.

Figure 13:
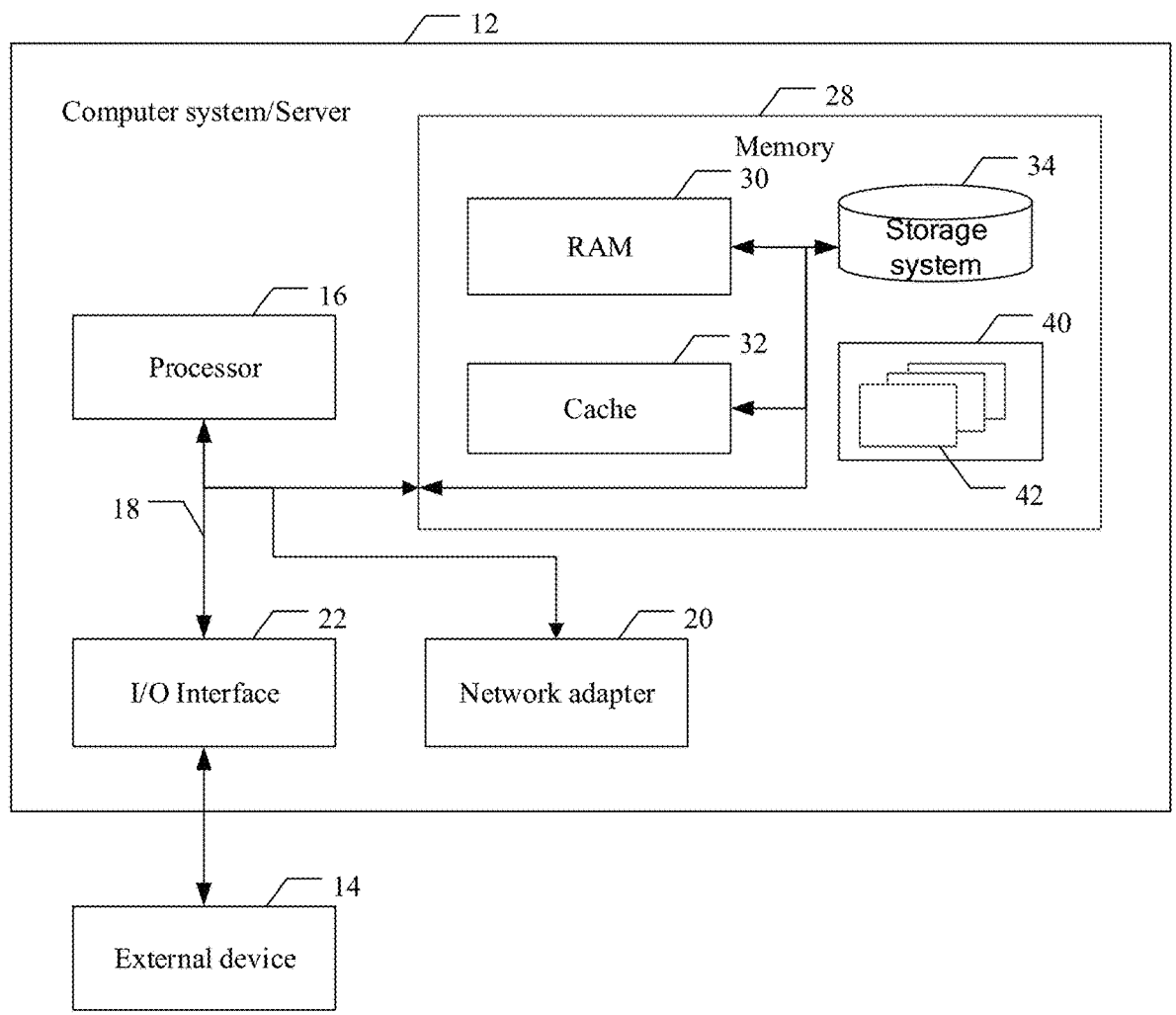
FIG. 13 illustrates a block diagram of an example computer system/server 12 adapted to implement an implementation mode of the present disclosure.

FIG. 13 illustrates a block diagram of an example computer system/server 12 adapted to implement an implementation mode of the present disclosure. The computer system/server 12 shown in FIG. 13 is only an example and should not bring about any limitation to the function and scope of use of the embodiments of the present disclosure.

As shown in FIG. 13, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown in FIG. 13 and typically called a "hard drive"). Although not shown in FIG. 13, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted in FIG. 13, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 4.

The present disclosure meanwhile provides a computer-readable storage medium on which a computer program is stored, the program, when executed by the processor, implementing the method stated in the embodiment shown in FIG. 4.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method may be implemented in other ways. For example, the above-described embodiments for the apparatus are only exemplary, e.g., the division of the units is merely logical one, and, in reality, they may be divided in other ways upon implementation.

The units described as separate parts may be or may not be physically separated, the parts shown as units may be or may not be physical units, i.e., they may be located in one place, or distributed in a plurality of network units. One may select some or all the units to achieve the purpose of the embodiment according to the actual needs.

Further, in the embodiments of the present disclosure, functional units may be integrated in one processing unit, or they may be separate physical presences; or two or more units may be integrated in one unit. The integrated unit described above may be implemented in the form of hardware, or they may be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for communicating with a rear vehicle, wherein the method comprises:
   a present vehicle determining that it is currently in a congestion scenario and obtaining congestion condition information;
   the present vehicle generating congestion prompt information for the rear vehicle according to the congestion condition information;
   the present vehicle displaying the congestion prompt information on a screen at a tail of the present vehicle,
   the present vehicle determining that a driver of a rear vehicle is in a road rage mood, at least by analyzing facial expressions and/or body behaviors of the driver of the rear vehicle obtained through a camera at the tail of the present vehicle; and
   in response to determining that the driver of the rear vehicle is in the road rage mood, generating mood-soothing information and displaying the mood-soothing information on the screen,
   wherein the congestion prompt information and the mood-soothing information are displayed on the screen alternatingly.

2. The method according to claim 1, wherein the present vehicle determining that it is currently m a congestion scenario comprises:
   the present vehicle determining that the present vehicle is currently in the congestion scenario if the present vehicle determines that a duration of the following state exceeds a predetermined duration: the current traffic slowly advances at a speed below a predetermined threshold.

3. The method according to claim 1, wherein the obtaining the congestion condition information comprises:
   the present vehicle obtaining the congestion condition information by interacting with an Internet-connected intelligent transportation system.

4. The method according to claim 1, wherein the congestion prompt information at least includes:
   a cause of congestion;
   the cause of congestion includes at least one of the following: an accident ahead, heavy traffic ahead, temporary road closures ahead, and congestion caused by weather.

5. The method according to claim 1, wherein the method further comprises:
   upon determining that the driver of the rear vehicle is in the road rage mood, the present vehicle turning on a streamline type lamp strip on the roof of the present vehicle and/or an annular lamp strip at the tail of the present vehicle to sooth the mood of the driver of the rear vehicle in a flowing pattern of atmosphere lamps.

6. A computer device, comprising a memory, a processor and a computer program which is stored on the memory and runs on the processor, wherein the processor, upon executing the program, implements a method for communicating with a rear vehicle, wherein the method comprises:
   a present vehicle determining that it is currently in a congestion scenario and obtaining congestion condition information;
   the present vehicle generating congestion prompt information for the rear vehicle according to the congestion condition information;
   the present vehicle displaying the congestion prompt information on a screen at a tail of the present vehicle,
   the present vehicle determining that a driver of a rear vehicle is in a road rage mood, at least by analyzing facial expressions and/or body behaviors of the driver of the rear vehicle obtained through a camera at the tail of the present vehicle; and
   in response to determining that the driver of the rear vehicle is in the road rage mood, generating mood-soothing information and displaying the mood-soothing information on the screen,
   wherein the congestion prompt information and the mood-soothing information are displayed on the screen alternatingly.

7. A non-transitory computer-readable storage medium on which a computer program is stored, wherein the program, when executed by a processor, implements a method for communicating with a rear vehicle, wherein the method comprises:
   a present vehicle determining that it is currently in a congestion scenario and obtaining congestion condition information;
   the present vehicle generating congestion prompt information for the rear vehicle according to the congestion condition information;
   the present vehicle displaying the congestion prompt information on a screen at a tail of the present vehicle, the present vehicle determining that a driver of a rear vehicle is in a road rage mood, at least by analyzing facial expressions and/or body behaviors of the driver of the rear vehicle obtained through a camera at the tail of the present vehicle; and in response to determining that the driver of the rear vehicle is in the road rage mood, generating mood-soothing information and displaying the mood-soothing information on the screen, wherein the congestion prompt information and the mood-soothing information are displayed on the screen alternatingly.

* * * * *